Sept. 6, 1966       N. R. SCHWARTZ       3,271,055
COUNTERBALANCED OSCILLATIVE JOINT
Original Filed May 27, 1960                4 Sheets—Sheet 1
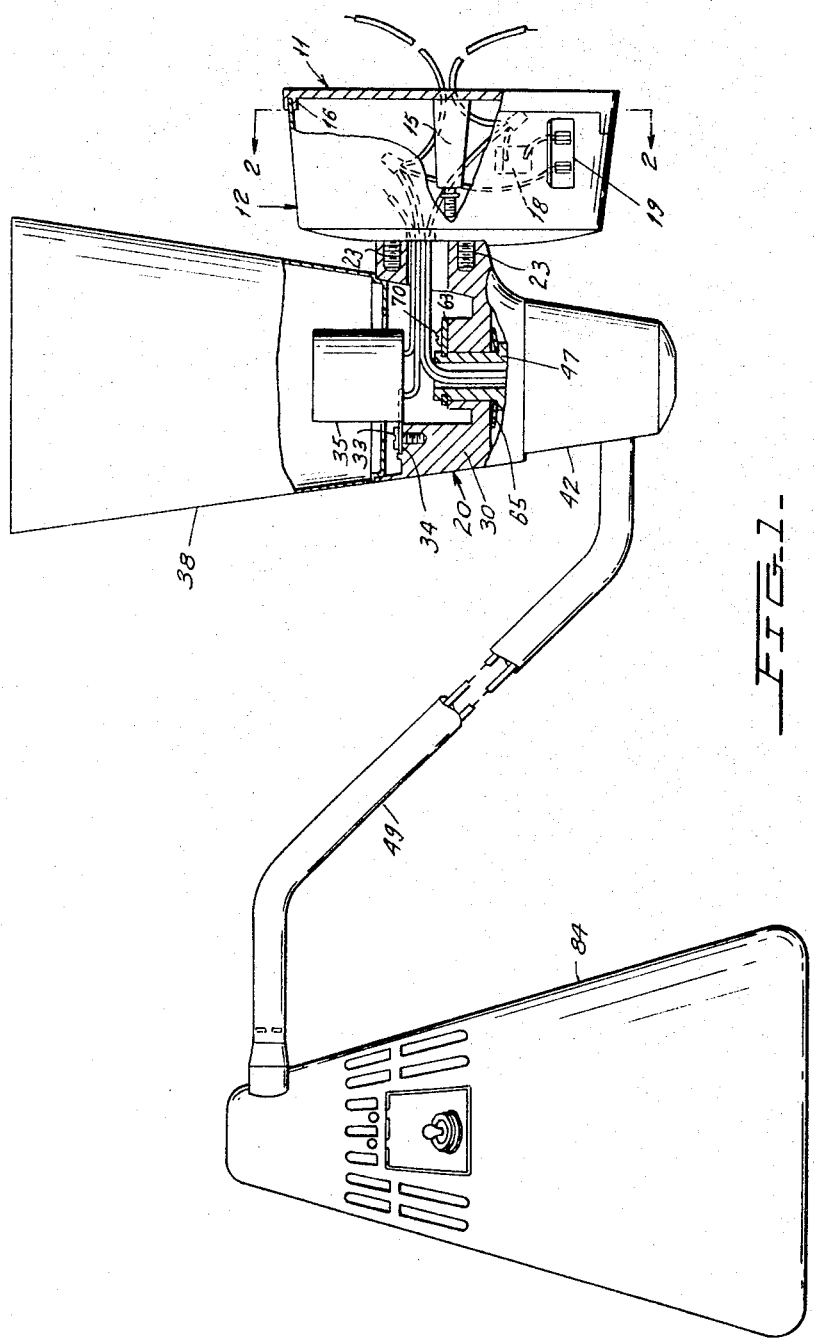
INVENTOR.
NATHAN R. SCHWARTZ
BY
OSTROLENK, FABER, GERB & SOFFEN
ATTORNEYS

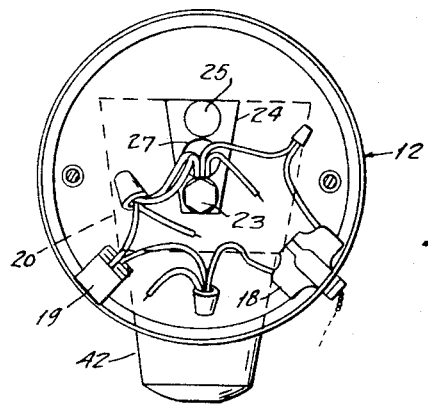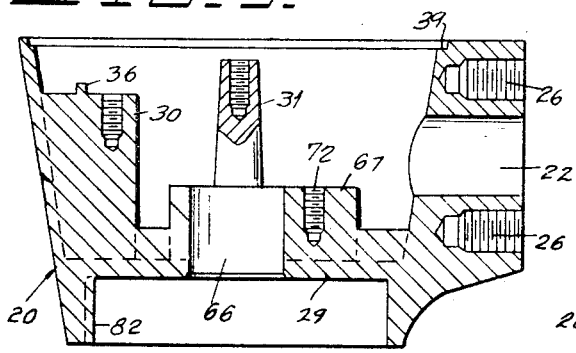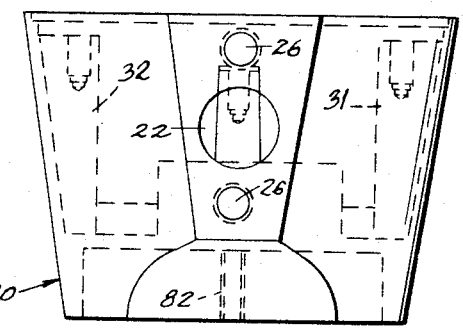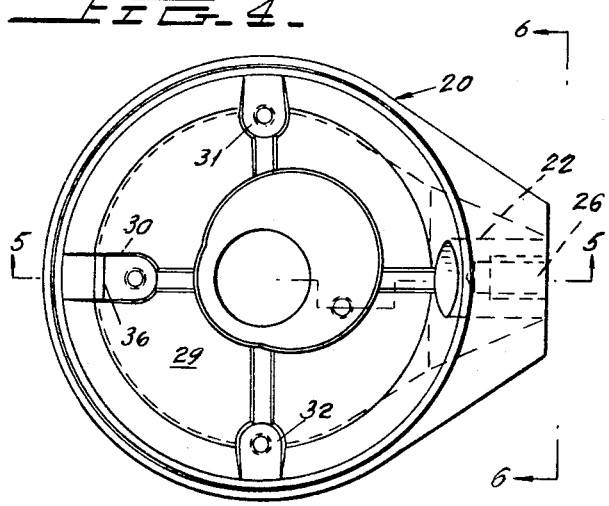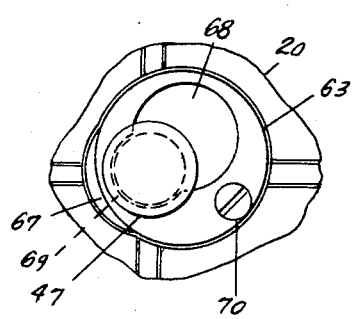

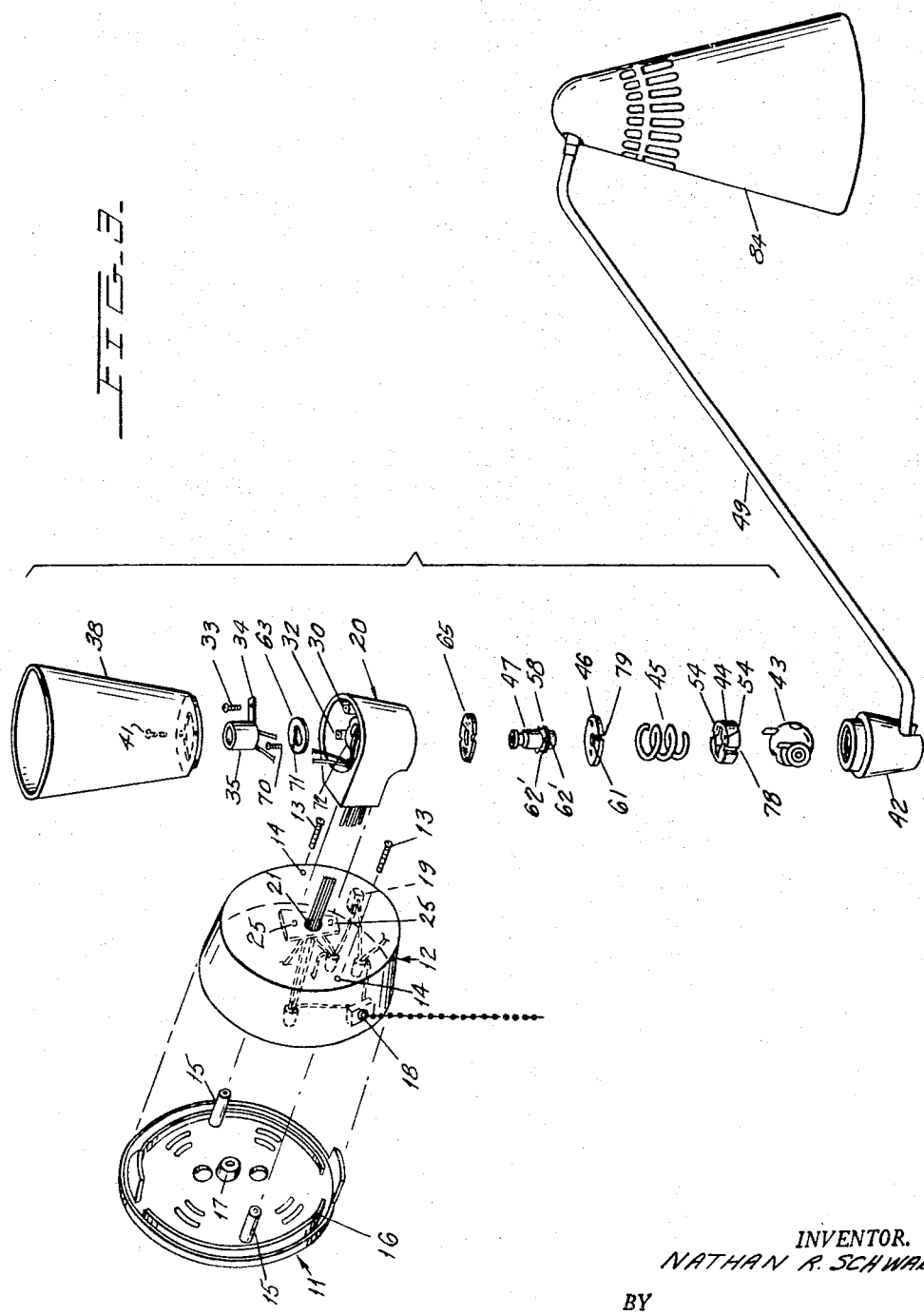

Sept. 6, 1966 N. R. SCHWARTZ 3,271,055
COUNTERBALANCED OSCILLATIVE JOINT
Original Filed May 27, 1960 4 Sheets-Sheet 4

INVENTOR.
NATHAN R. SCHWARTZ
BY
OSTROLENK, FABER, GERB & SOFFEN
ATTORNEYS

United States Patent Office 3,271,055
Patented Sept. 6, 1966

---

3,271,055
COUNTERBALANCED OSCILLATIVE JOINT
Nathan R. Schwartz, Yonkers, N.Y., assignor, by mesne assignments, to Swivelier Company, Inc., Nanuet, N.Y., a corporation of New York
Original application May 27, 1960, Ser. No. 32,438, now Patent No. 3,122,331, dated Feb. 25, 1964. Divided and this application July 31, 1963, Ser. No. 307,275
5 Claims. (Cl. 285—264)

The present invention relates to electrical lighting fixtures and represents improvements over the fixtures described in my U.S. Patents 2,925,294 and 2,925,489. More specifically, this invention relates to an improved counterbalancing swivel joint construction for such a lighting fixture.

This application is a division of application Serial No. 32,438 filed on May 27, 1960, now Patent No. 3,122,331.

In my aforesaid Patent 2,924,294 there is disclosed a counterbalancing swivel joint which is spring biased in such a manner as to aid in the movement of a load bearing arm in one direction so that a load, in this case, a light source, may be mounted to a relative long moment arm. The elements of the swivel joint are mounted within a shell constructed of sheet material drawn to shape.

With this construction it has been found that the loads which the swivel joint is capable of supporting are often limited. That is, since the shell is shaped by a drawing process the walls are usually thin to facilitate shaping. If the shell wall is increased in thickness the shaping process is made materially more difficult.

This invention overcomes the above noted deficiency of the prior art by providing a swivel joint having a cast relatively thick walled shell. The thickness of the wall does not present any problems in the casting process and it has been found that the shell is less costly to produce as a cast member than as a drawn member. The thick walled shell is not only strong but may be of larger size than the thin walled shell so as to accommodate therein large springs capable of counterbalancing heavier loads than can be handled by a swivel joint having a thin walled shell.

In my aforesaid Patent 2,925,489 the lighting fixture disclosed therein comprises a first light source mounted directly to a canopy which is removably mounted to a wall plate and a second light source mounted to one end of a long arm whose other end is supported by a swivel joint. The swivel joint in turn is mounted directly to the wall plate.

In contrast, the lighting fixture disclosed herein comprises a canopy removably mounted to a wall plate and directly mounted to the canopy is a hollow bracket. This bracket has mounted directly thereto on the top thereof a first light source and on the bottom thereof a swivel joint means having the cast shell as herebefore described. The swivel joint supports a long arm at one end thereof with the other end of the arm having a second light source mounted thereto. This construction is materially simplified over the prior art as exemplified by my aforesaid Patent 2,925,489 through the elimination of a large number of elements.

It is among the objects of this invention to provide a counterbalancing swivel unit which is capable of supporting heavy loads, and which may be utilized in such lighting fixture.

A still further object is to provide such a swivel joint wherein the moving elements are housed within a cast relatively thick walled shell.

These as well as other objects of the instant invention shall become readily apparent after reading the following description of the accompanying drawings in which:

FIGURE 1 is a side elevation, partially sectioned, of a lighting fixture constructed in accordance with the teachings of the instant invention.

FIGURE 2 is a cross-section taken through line 2—2 of FIGURE 1, with the wall plate removed, looking in the direction of arrows 2—2.

FIGURE 3 is an exploded view of the lighting fixture of FIGURE 1.

FIGURE 4 is a plan view of the hollow bracket to which the light sources are mounted.

FIGURE 5 is a cross-section taken through line 5—5 of FIGURE 4.

FIGURE 6 is an end view of the bracket of FIGURE 4 looking in the direction of arrows 6—6.

FIGURE 10 is a fragmentary plan view of the bracket of FIGURE 4 with the swivel joint of FIGURE 7 mounted thereto.

Figure 7:
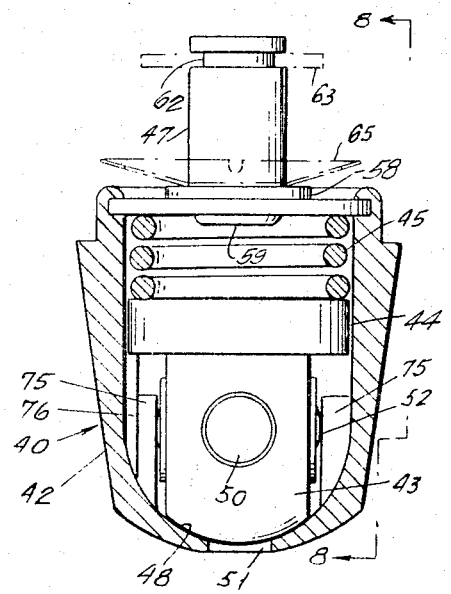
FIGURE 7 is a side elevation of the counterbalanced swivel joint with the shell broken away to reveal internal elements.
Figure 11:
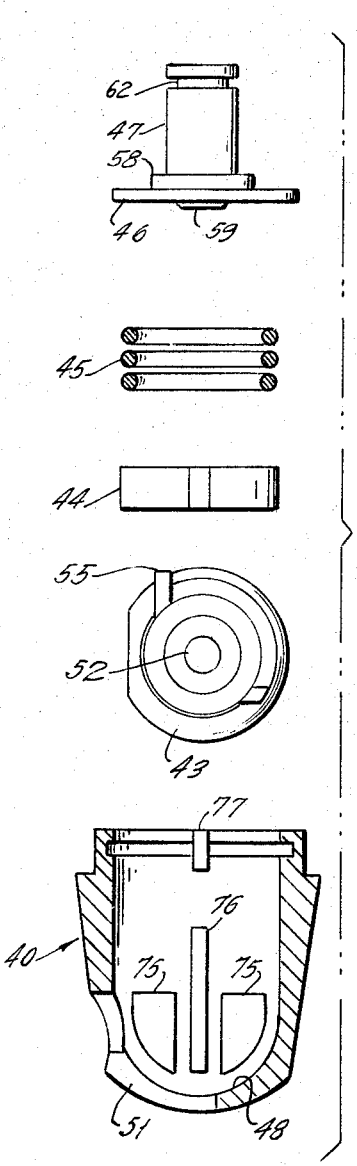
FIGURE 11 is an exploded view of the counterbalanced swivel joint, as illustrated in FIGURE 8.

Now referring to the figures, the lighting fixture of this invention generally comprises wall plate 11 having a bowl shaped canopy 12 mounted thereto by screws 13 which pass through clearance holes 14 in canopy 12 and are received by threaded apertures in posts 15 extending forwardly from plate 11 and formed integrally therewith.

Wall plate 11 also includes a forwardly extending mounting ring 16 against which canopy 12 bears and a plurality of arcuate and straight slots closed by knock-out formations for the passage of bolts or other means to mount wall plate 11 in the desired location. Wall plate 11 is also provided with apertures 17 through which electrical conductors may pass. A pull chain operated switch 18 as well as a plug receptable 19 are mounted to the side wall of canopy 12 in a manner well known to the art and are electrically connected to each other as well as to light sources, which will be hereinafter described, also in a manner well known to the art.

Canopy 12 further includes a central wire receiving aperture 21 which is aligned with wire receiving aperture 22 of bracket 20 (FIGURE 4). Bolts 23 (FIGURE 2) pass through clearance holes in stiffening member 24 and clearance holes 25 in canopy 12 to be received by threaded apertures 26 in bracket 20 to fixedly secure bracket 20 to canopy 12. Member 24 also includes wire receiving aperture 27 which is aligned with the wire receiving apertures 21, 22 of canopy 12 and bracket 20, respectively.

Figure 8:
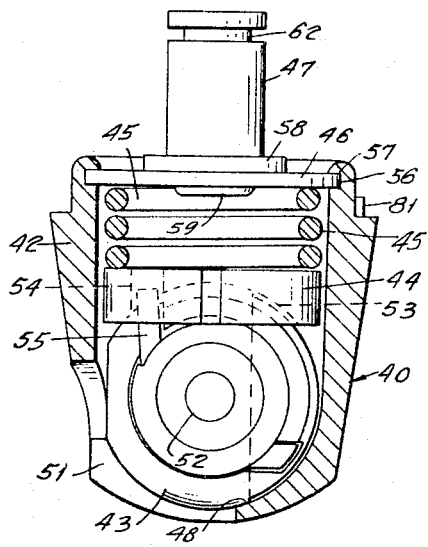
FIGURE 8 is a side elevation of the counterbalanced swivel joint of FIGURE 7 looking in the direction of arrows 8—8 with the shell broken away to reveal the internal elements.
Figure 9:
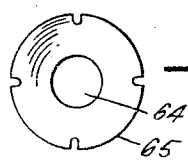
FIGURE 9 is a plan view of the spring washer which is interposed between the joint means of FIGURE 7 and the bracket of FIGURE 4.

Bracket 20 is a generally hollow member having a horizontal partition 29. Three posts 30–32 extend upwardly from partition 29. Bolt 33, passing through a clearance hole in bracket 34 of a first light source having a bulb socket 35, is received by a threaded aperture in post 30 to secure socket 35 to bracket 20. The free end of bracket 34 abuts raised formation 36 of post 30 to thereby prevent rotation of socket 35. Frustoconical lamp shade 38 having an inwardly turned lip at the lower end thereof is seated on internal ledge 39 of bracket 20. Screws 41 passing through clearance holes in the lip and received by threaded apertures in posts 31, 32 secure shade 38 to bracket 20. Counterbalancing swivel joint 40 (FIGURES 7 and 8) is mounted to the bottom of bracket 20 in a manner to be hereinafter explained.

Counterbalancing swivel joint 40 comprises shell 42 having mounted thereto ball assembly 43, cup washer 44, compression spring 45, closure member 46 and nipple 47. Sheel 42 is a cast relatively thick walled member having a rounded internal surface 48 at the lower end thereof which provides a seat for ball assembly 43. Load bearing arm 49 is entered into the central wire passage 50 of ball assembly 43 as well as through a substantially 90° slot 51 in the rounded end of shell 42. The length of slot 51 is selected to limit the movement of arm 49 about axis 52 to substantially 90°.

Washer 44 includes a curved surafce 53 which also provides a seat for ball assembly 43 and further includes a pair of slots 54 which receive the ends of torsion springs 55 which are part of ball assembly 43. Closure member 46 is seated on ledge 56 of shell 42 and is retained thereon by the deformed lip 57 of shell 42 at the upper end thereof. Compression spring 45 is interposed between closure member 46 and cup washer 44 so as to urge cup washer 44 against ball assembly 43 and in turn urge ball assembly 43 firmly against seat 48.

Nipple 47 is provided with a shoulder 58 which rests against closure member 46. The lower end 59 of nipple 47 extends from shoulder 58, passes through the central aperture 61 of closure member 46, and is deformed so as to fixedly secure nipple 47 to member 46. Cutouts 62' in shoulder 58 cooperate with suitably formed raised portions of member 46 to prevent relative rotation between nipple 47 and member 46. Nipple 47 is provided near the upper end thereof with a peripheral groove 62 which receives retainer washer 63 for pivotal mounting of swivel unit 40 to bracket 20.

Swivel unit 40 is mounted to bracket 20 by first inserting nipple 47 through the central aperture 64 of spring washer 65 and thereafter through aperture 66 of partition 29. Spring washer 65 is then loaded by moving swivel unit 40 toward the lower surface of partition 29 until groove 62 is completely above partition surface 67. Retainer 63 is mounted to nipple 47 by inserting the upper end of nipple 47 through aperture 68 of retainer 63. Thereafter, retainer 63 is moved horizontally into groove 62 with the portion of nipple 47 defining groove 62 being disposed within another aperture 69 of retainer 63 which is too small to receive the upper end of nipple 47. Retainer 63 is maintained in this position by screw 70 which passes through clearance hole 71 in retainer 63 and is received by threaded aperture 72 in partition 29.

Shell 42 is provided with integrally formed internal formations 75-77. There are four formations 75, only two of which are shown, which engage the flattened sides of ball assembly 43 to prevent rotation of same relative to shell 42 about an axis transverse to bore 50 and axis 52. Relative rotation between cup washer 44 and shell 42 is prevented through the cooperation of washer slot 78 and internal formation 76. Similarly, relative rotation between closure member 46 and shell 42 is prevented through the cooperation of closure member notch 79 and internal formation 77.

Stop projection 81 of shell 42 cooperates with stop projection 82 of bracket 20 to limit the relative rotation between swivel unit 40 and bracket 20 to substantially 360°.

By casting shell 42 it may readily be provided with thick walls of substantial strength. This enables a large ball assembly 43 to be housed therein with the ball assembly 43 including strong torsion spring so that the load, in this case light source 84, at the end of long moment arm 49 may be relatively heavy.

It is to be noted that bracket 20 is provided with an outer surface that is rounded and gradually tapered in the portion at the left with respect to FIGURES 4 and 5. This portion of the bracket outer surface blends with the outer surface of lamp shade 38 as well as the outer surface of shell 42 so that the three appear to be continuous when viewed from the side.

Thus, this invention provides an improved counterbalancing swivel joint unit construction whereby extremely heavy loads may be supported. In addition, this invention provides an overall simplified lighting fixture construction by providing a single bracket which supports two separate light sources one of which is mounted to the end of a long moment arm, and pivotable for substantially 90° about a horizontal axis as well as pivotable for substantially 360° about a vertical axis.

Although the invention has been set forth with exemplary constructions and arrangements, it is to be understood that the features, principles and manner of application thereof may be varied by thosce skilled in the art, without departing from the broader spirit and scope of the invention as defined in the following claims:

I claim:
1. A counterbalanced swivel joint which comprises:
   (a) a swivel ball having a bore therethrough;
   (b) a shell wherein said ball is disposed, the shell comprising a cast member having a rounded internal wall at one end thereof against which the ball is seated, said shell having an elongated opening adjacent said bore of said ball and the longitudinal axis of said shell being parallel to the axis of said ball;
   (c) a torsion spring mounted within said shell and having its axis arranged normal to the axis of said ball and normal to the axis of the bore in said ball, one end of the torsion spring being secured to the ball and the other end being held in fixed relationship with respect to the shell;
   (d) a first means formed integrally with said shell and operatively engaging cooperating means on said ball for preventing the ball from pivoting about the axis of said bore while permitting the same to pivot about the axis of said torsion spring, said elongated opening, bore of said ball, longitudinal axis of said shell and the axis of said ball, all lying in a common plane;
   (e) a washer having a curved seat engaging said ball and means on the washer for securing said other end of the torsion spring;
   (f) a second means formed integrally with said shell and operatively engaging cooperating means on said washer for preventing relative rotation between the washer and the shell;
   (g) retaining means attached on the end of said shell opposite from the rounded internal wall thereof;
   (h) a loaded compression spring interposed between said retaining means and said washer to urge the washer against said ball and, in turn, to urge the ball against the rounded internal walls of said shell, and
   (i) a third means formed integrally with said shell and operatively engaging cooperating means on said retaining means for preventing relative rotation between the retaining means and the shell.

2. The counter-balanced swivel joint of claim 1, in which said retaining means comprises a washer and a nipple fixedly secured to said washer and extending from the plane thereof beyond said other end of said shell, with the nipple bore and washer hole in alignment, and in which a formation is provided on said nipple operatively engaging a cooperating element on said washer to prevent relative rotation between the nipple and the washer.

3. The counter-balanced swivel joint of claim 1, in which said first means formed integrally with the shell member comprises a plurality of formations provided internally of said shell and in which the cooperating means on said ball comprises a plurality of flattened sides of the ball preventing rotation of the same relative to the shell.

4. The counter-balanced swivel joint of claim 1, in which said second means formed integrally with said shell member comprises a formation provided internally of said shell and in which the cooperating means on said washer comprises a slot in the washer preventing rotation of the same relative to the shell.

5. The counter-balanced swivel joint of claim 1, in which said third means formed integrally with said shell member comprises a formation provided internally of said shell and in which the cooperating means on said retaining means comprises a notch in the retaining means preventing rotation of the retaining means relative to said shell.

References Cited by the Examiner

UNITED STATES PATENTS

| | | | |
|---|---|---|---|
| 339,595 | 4/1886 | Stone | 285—354 X |
| 916,301 | 3/1909 | Greenlaw | 285—264 |
| 1,067,642 | 7/1913 | Byam | 285—264 |
| 2,362,100 | 11/1944 | Schwartz | 285—264 X |
| 2,925,294 | 2/1960 | Schwartz. | |
| 3,012,798 | 12/1961 | Berger | 285—269 X |

CARL W. TOMLIN, *Primary Examiner.*

EDWARD C. ALLEN, *Examiner.*

D. W. AROLA, *Assistant Examiner.*